United States Patent
Davis et al.

(10) Patent No.: US 6,981,196 B2
(45) Date of Patent: Dec. 27, 2005

(54) DATA STORAGE METHOD FOR USE IN A MAGNETORESISTIVE SOLID-STATE STORAGE DEVICE

(75) Inventors: James A Davis, Richmond, VA (US); Jonathan Jedwab, Bristol (GB); Kenneth Graham Paterson, Teddington (GB); Gadiel Seroussi, Cupertino, CA (US); Kenneth K Smith, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 584 days.

(21) Appl. No.: 09/915,195

(22) Filed: Jul. 25, 2001

(65) Prior Publication Data

US 2003/0023924 A1 Jan. 30, 2003

(51) Int. Cl.[7] .............................................. G11C 29/00
(52) U.S. Cl. ...................................................... 714/763
(58) Field of Search ................................ 714/752, 763, 714/773; 365/201

(56) References Cited

U.S. PATENT DOCUMENTS

| | | | |
|---|---|---|---|
| 4,069,970 A | 1/1978 | Buzzard et al. | 235/312 |
| 4,209,846 A | 6/1980 | Seppa | 364/900 |
| 4,216,541 A | 8/1980 | Clover et al. | 371/38 |
| 4,458,349 A | 7/1984 | Aichelmann, Jr. et al. | 371/13 |
| 4,933,940 A | 6/1990 | Walter et al. | 371/9.1 |

(Continued)

FOREIGN PATENT DOCUMENTS

| | | | | |
|---|---|---|---|---|
| EP | 0 494 547 A2 | 7/1992 | | G06F/11/00 |
| EP | 0 918 334 A2 | 5/1999 | | G11C/11/15 |
| EP | 1 132 924 A2 | 9/2001 | | G11C/29/00 |
| JP | 03-244218 | 10/1991 | | |
| JP | 10-261043 | 9/1998 | | |

OTHER PUBLICATIONS

Abstract of Japanese Patent No. JP 60007698, published Jan. 16, 1985, esp@cenet.com.

Peterson, W.W. and E.J. Weldon, Jr., *Error–Correcting Codes*, Second Edition, MIT Press, Ch. 1–3, 8 and 9 (1994).

*Reed–Solomon Codes and Their Applications*, S.B. Wicker and V.K. Bhargava, ed., IEEE Press, New York, Ch. 1, 2, 4 and 12 (1994).

*Primary Examiner*—Albert DeCady
*Assistant Examiner*—Esaw Abraham

(57) ABSTRACT

A magnetoresistive solid-state storage device (MRAM) performs error correction coding (ECC) of stored information. Since currently available MRAM devices are subject to physical failures, data storage arrangements are described to minimize the affect of those failures on the stored ECC encoded data, including storing all bits of each symbol in storage cells 16 in one row 12 (FIG. 3), or in at least two rows 12 but using storage cells 16 in the same columns 14 (FIG. 4). Sets of bits taken from each row 12 are allocated to different codewords 204 (FIG. 5) and the order of allocation can be rotated (FIG. 6). A second level of error checking can be applied by adding a parity bit 226 to each symbol 206 (FIG. 7).

75 Claims, 5 Drawing Sheets

U.S. PATENT DOCUMENTS

| | | | |
|---|---|---|---|
| 4,939,694 A | 7/1990 | Eaton et al. | 365/200 |
| 5,233,614 A | 8/1993 | Singh | 371/21.6 |
| 5,263,030 A * | 11/1993 | Rotker et al. | 714/762 |
| 5,313,464 A * | 5/1994 | Reiff | 714/701 |
| 5,428,630 A | 6/1995 | Weng et al. | 371/40.1 |
| 5,459,742 A | 10/1995 | Cassidy et al. | 371/40.1 |
| 5,488,691 A | 1/1996 | Fuoco et al. | 395/185.05 |
| 5,502,728 A | 3/1996 | Smith, III | 395/182.03 |
| 5,504,760 A | 4/1996 | Harari et al. | 371/40.1 |
| 5,590,306 A | 12/1996 | Watanabe et al. | 395/442 |
| 5,621,690 A | 4/1997 | Jungroth et al. | 365/200 |
| 5,745,673 A | 4/1998 | Di Zenzo et al. | 395/182.05 |
| 5,793,795 A | 8/1998 | Li | 375/200 |
| 5,848,076 A | 12/1998 | Yoshimura | 37/40.11 |
| 5,852,574 A | 12/1998 | Naji | 365/158 |
| 5,864,569 A | 1/1999 | Roohparvar | 371/40.18 |
| 5,887,270 A | 3/1999 | Brant et al. | 711/162 |
| 5,966,389 A * | 10/1999 | Kiehl | 714/763 |
| 5,987,573 A | 11/1999 | Hiraka | 711/156 |
| 6,112,324 A | 8/2000 | Howe et al. | 714/763 |
| 6,166,944 A | 12/2000 | Ogino | 365/97 |
| 6,233,182 B1 | 5/2001 | Satou et al. | 365/200 |
| 6,275,965 B1 | 8/2001 | Cox et al. | 714/755 |
| 6,279,133 B1 | 8/2001 | Vafai et al. | 714/763 |
| 6,407,953 B1 | 6/2002 | Cleeves | 365/201 |
| 6,408,401 B1 | 6/2002 | Bhavsar et al. | 714/7 |
| 6,430,702 B1 | 8/2002 | Santeler et al. | 714/6 |
| 6,456,525 B1 | 9/2002 | Perner et al. | 365/171 |
| 6,483,740 B1 | 11/2002 | Spitzer et al. | 365/158 |
| 2002/0029341 A1 | 3/2002 | Juels et al. | 713/184 |
| 2003/0023911 A1 | 1/2003 | Davis et al. | 714/723 |
| 2003/0023922 A1 | 1/2003 | Davis et al. | 714/763 |
| 2003/0023923 A1 | 1/2003 | Davis et al. | 714/763 |
| 2003/0023925 A1 | 1/2003 | Davis et al. | 714/763 |
| 2003/0023926 A1 | 1/2003 | Davis et al. | 714/763 |
| 2003/0023927 A1 | 1/2003 | Jedwab et al. | 714/763 |
| 2003/0023928 A1 | 1/2003 | Jedwab et al. | 714/763 |
| 2003/0156469 A1 | 8/2003 | Viehmann et al. | 365/200 |
| 2003/0172329 A1 | 9/2003 | Davis et al. | 714/710 |
| 2003/0172339 A1 | 9/2003 | Davis et al. | 714/763 |

* cited by examiner

10

DATA STORAGE METHOD FOR USE IN A MAGNETORESISTIVE SOLID-STATE STORAGE DEVICE

CROSS REFERENCE TO RELATED APPLICATION

This application is related to the pending U.S. patent application Ser. No. 09/440,323 filed on Nov. 15, 1999.

The present invention relates in general to the field of magnetoresistive solid-state storage devices and to a method for storing data in such a device. In particular, but not exclusively, the invention relates to a magnetoresistive solid-state storage device employing error correction coding, and to data storage arrangements which improve effective use of such error correction coding.

A typical solid-state storage device comprises one or more arrays of storage cells for storing data. Existing semiconductor technologies provide volatile solid-state storage devices suitable for relatively short term storage of data, such as dynamic random access memory (DRAM), or devices for relatively longer term storage of data such as static random access memory (SRAM) or non-volatile flash and EEPROM devices. However, many other technologies are known or are being developed.

Recently, a magnetoresistive storage device has been developed as a new type of non-volatile solid-state storage device (see, for example, EP-A-0918334 Hewlett-Packard). The magnetoresistive solid-state storage device is also known as magnetic random access memory (MRAM) device. MRAM devices have relatively low power consumption and relatively fast access times, particularly for data write operations, which renders MRAM devices ideally suitable for both short term and long term storage applications.

A problem arises in that MRAM devices are subject to physical failure, which can result in an unacceptable loss of stored data. Currently available manufacturing techniques for MRAM devices are subject to limitations and as a result manufacturing yields of commercially acceptable MRAM devices are relatively low. Although better manufacturing techniques are being developed, these tend to increase manufacturing complexity and cost. Hence, it is desired to apply lower cost manufacturing techniques whilst increasing device yield. Further, it is desired to increase cell density formed on a substrate such as silicon, but as the density increases manufacturing tolerances become increasingly difficult to control, again leading to higher failure rates and lower device yields. Since the MRAM devices are at a relatively early stage in development, it is desired to allow large scale manufacturing of commercially acceptable devices, whilst tolerating the limitations of current manufacturing techniques.

An aim of the present invention is to provide a magnetoresistive solid-state storage device which is tolerant of at least some failures. Another aim is to provide a data storage arrangement or method for storing data in a magnetoresistive solid-state storage device which improves tolerance of at least some failures.

According to a first aspect of the present invention there is provided a method for storing data in a magnetoresistive solid-state storage device having an array of storage cells, the method comprising the steps of: encoding a logical unit of original information to form a block of ECC encoded data; and storing the block of ECC encoded data in the array of storage cells.

Preferably, the ECC encoded data is formed having multi-bit symbols. Preferably, a linear encoding scheme is employed such as a Reed-Solomon code having eight-bit symbols.

Preferably, the storage device comprises plural arrays, at least some of the arrays being arranged to store one or more symbols from the block of ECC encoded data. In the preferred embodiment, the plural arrays are gathered to form a macro-array and the block of ECC encoded data is stored with symbols in each of the plurality of arrays. As a result, a substantial portion of each block of ECC encoded data is accessible in the storage device, giving relatively fast read and write operations.

The storage cells of each array can be arranged in any suitable form, but are suitably arranged in rows, and preferably in columns.

In a first preferred embodiment, at least some and preferably all bits of a multi-bit symbol are stored in a single row. That is, the n bits of each multi-bit symbol are each stored in one row of the rows of storage cells. Preferably, the n bits of a symbol are spaced at least a minimum reading distance m apart, such that all n bits are readable from the row in a single action. Advantageously, a probability that a symbol will be affected by a physical failure is substantially reduced.

In a second preferred embodiment, a multi-bit symbol is stored with one or more bits in at least two of the rows. For each multiple-bit symbol, a first set of bits are stored in a first row, and a second set of bits are stored in a second row. Ideally, at least some and preferably all columns of the first set of bits are common to at least some and preferably all columns of the second set of bits. Although it is possible for just one of the bits of the multi-bit symbol to be stored in a separate row, preferably a plurality of bits are stored in each of the at least two rows. In this embodiment, each n-bit symbol is stored across a plurality of rows r. In the most preferred example, the n bits of each symbol are stored in an arrangement of storage cells according to r×(n/r). In this embodiment, each symbol is readable by taking a slice from each of the at least two rows. Although more than one slice is required to read each symbol, the probability that a symbol will be affected by physical failures is reduced even more than in the first preferred embodiment.

In a third preferred embodiment, one of the rows of storage cells stores a set of bits from at least two of the multi-bit symbols. Preferably, each set of bits is allocated to a different one of at least two blocks of ECC encoded data. In the particularly preferred embodiment each set of bits from one row is allocated to a different one of a plurality of codewords, plural codewords being associated to form a sector of ECC encoded data representing the logical unit of original information. Preferably, the sets of bits from the one row of storage cells are each allocated to symbols within a different codeword for the single sector of ECC encoded data.

This third embodiment is preferably combined with the first preferred embodiment, such that each of the sets of bits from one row comprises all of the bits from a multi-bit symbol, and the two or more multi-bit symbols taken from a single row are each allocated to different codewords of a single sector of ECC encoded data.

This third preferred embodiment can also be combined with the second preferred embodiment. Here, the plural sets of bits stored in each row each form part but not all of the multi-bit symbol. Within each row, the various sets of bits are allocated to different symbols, and those symbols in turn are allocated to different codewords. By accessing plural rows, each symbol is completed from a set of bits within each row. Preferably, for each multi-bit symbol, a first set of bits are stored in a first row, and a second set of bits are stored in a second row, such that at least some columns of the first set of bits are common to at least some columns of the second set of bits.

The third preferred embodiment is also applicable to an error correction coding scheme employing single-bit symbols. Here, at least two single-bit symbols are read from a single row of storage cells, and the at least two single-bit symbols are each allocated to a different one of at least two blocks of encoded data. Preferably, each single-bit symbol from one row is allocated to a different one of a plurality of codewords, plural codewords being associated to form a sector of ECC encoded data representing a logical unit of original information.

In each case, the third preferred embodiment minimises the adverse affect of a group failure occurring within a particular row of storage cells, because the symbols wholly or partially stored in that row are allocated to different codewords.

In a fourth preferred embodiment, plural sets of bits are stored in each row of storage cells and, similar to the third preferred embodiment, those sets of bits are allocated to at least two different units of encoded data, such as different codewords. In this fourth preferred embodiment, an order of allocation of those sets of bits amongst the different units of encoded data is changed between at least some rows. That is, a first row stores a set of bits from a symbol allocated to a first codeword, and stores a set of bits from a symbol allocated to a second codeword. A second row stores sets of bits from symbols allocated to the same codewords, but in a different order. For example, the second row stores, in order, a set of bits from a symbol allocated to the second codeword, and then a set of bits from a symbol allocated to the first codeword. Preferably, to further minimise the adverse affects of physical failures, suitably the columns of the sets of bits in the first row are shared by at least some and ideally all columns of the sets of bits in the second row. In the most preferred example of the fourth embodiment, the order of allocation of the sets of bits is rotated amongst the different codewords, for ease of management.

In a fifth preferred embodiment, the encoding step comprises forming an error check for each multi-bit symbol. Conveniently, at least one error detecting bit is provided associated with each multi-bit symbol. The error detecting bit or bits allow a parity check to be performed on the multi-bit symbol. Preferably, each multi-bit symbol and the one or more error detecting bits are stored together in the array as a symbol unit. Conveniently, each symbol unit is stored with all bits in a single row of storage cells, as in the first preferred embodiment. Alternatively, each symbol unit is stored with bits in at least two rows of storage cells, as in the second preferred embodiment. Sets of bits for each symbol unit may be allocated as in the third or fourth embodiments.

Also according to the present invention there is provided a magnetoresistive solid-state storage device, comprising: at least one array of magnetoresistive storage cells; an ECC encoding unit for encoding a logical unit of original information to form a block of ECC encoded data; and a controller for storing the block of ECC encoded data in the at least one array of storage cells.

The device is preferably adapted to operate according to any of the first to fifth preferred embodiments described herein.

For a better understanding of the invention, and to show how embodiments of the same may be carried into effect, reference will now be made, by way of example, to the accompanying diagrammatic drawings in which.

To assist a complete understanding of the present invention, an example MRAM device will first be described with reference to FIG. 1, including a description of the failure mechanisms found in MRAM devices. The data storage layouts adopted in the preferred embodiments of the present invention aim to minimise the adverse effects of such physical failures and are described with reference to FIGS. 2 to 7.

Figure 1:
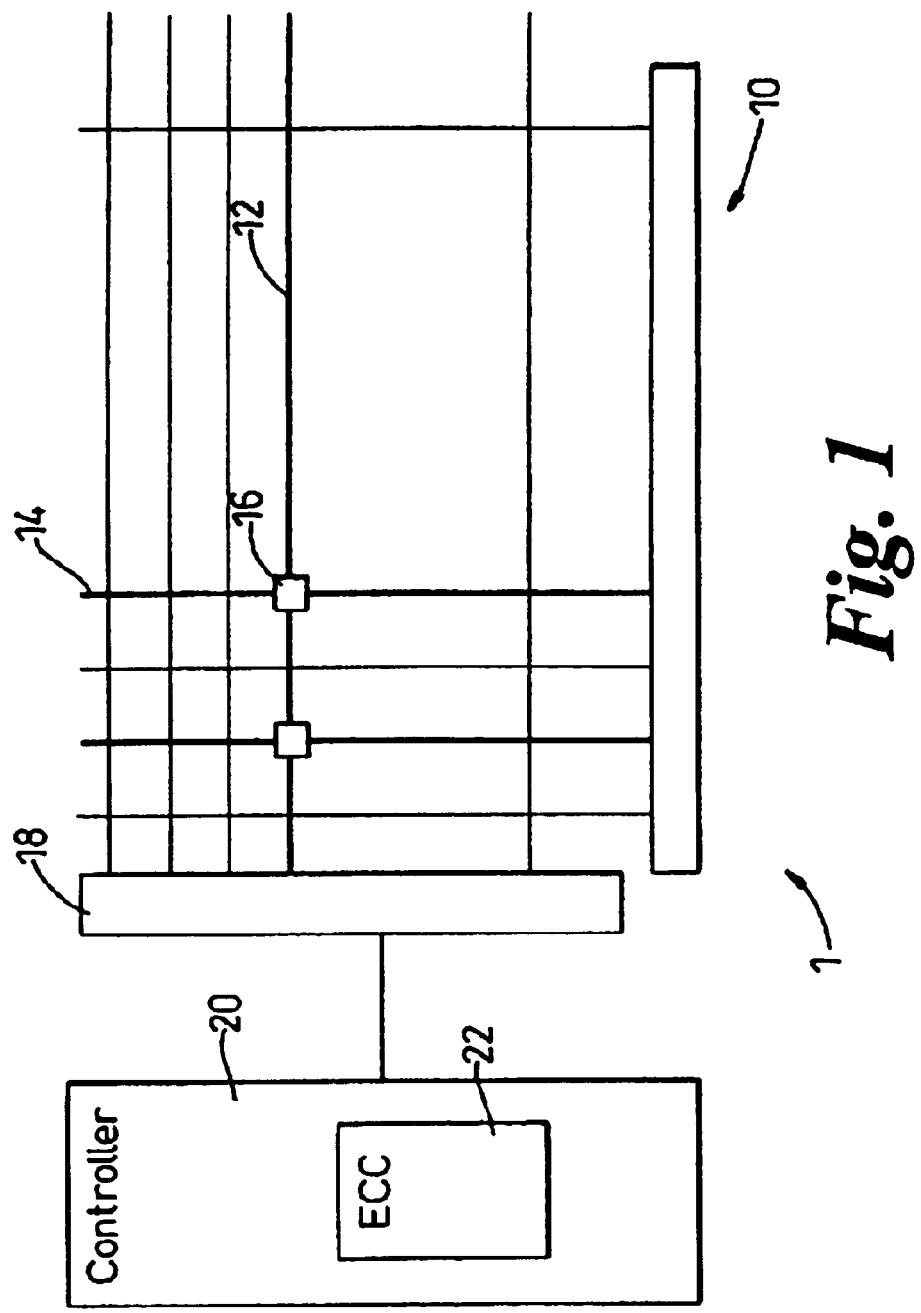
FIG. 1 is a schematic diagram showing a preferred MRAM device including an array of storage cells.

FIG. 1 shows a simplified magnetoresistive solid-state storage device 1 comprising an array 10 of storage cells 16. The array 10 is coupled to a controller 20 which, amongst other control elements, includes an ECC coding and decoding unit 22. The controller 20 and the array 10 can be formed on a single substrate, or can be arranged separately.

In one preferred embodiment, the array 10 comprises of the order of 1024 by 1024 storage cells, just a few of which are illustrated. The cells 16 are each formed at an intersection between control lines 12 and 14. In this example control lines 12 are arranged in rows, and control lines 14 are arranged in columns. One row 12 and one or more columns 14 are selected to access the required storage cell or cells 16 (or conversely one column and several rows, depending upon the orientation of the array). Suitably, the row and column lines are coupled to control circuits 18, which include a plurality of read/write control circuits. Depending upon the implementation, one read/write control circuit is provided per column, or read/write control circuits are multiplexed or shared between columns. In this example the control lines 12 and 14 are generally orthogonal, but other more complicated lattice structures are also possible.

In a read operation of the currently preferred MRAM device, a single row line 12 and several column lines 14 (represented by thicker lines in FIG. 1) are activated in the array 10 by the control circuits 18, and a set of data read from those activated cells. This operation is termed a slice. The row in this example is 1024 storage cells long l and the accessed storage cells 16 are separated by a minimum reading distance m, such as sixty-four cells, to minimise cross-cell interference in the read process. Hence, each slice provides up to $l/m=1024/64=16$ bits from the accessed array.

To provide an MRAM device of a desired storage capacity, preferably a plurality of independently addressable arrays 10 are arranged to form a macro-array. Conveniently, a small plurality of arrays 10 (typically four) are layered to form a stack, and plural stacks are arranged together, such as in a 16×16 layout. Preferably, each macro-array has a 16×18×4 or 16×20×4 layout (expressed as width×height× stack layers). Optionally, the MRAM device comprises more than one macro-array. In the currently preferred MRAM device only one of the four arrays in each stack can be accessed at any one time. Hence, a slice from a macro-array reads a set of cells from one row of a subset of the plurality of arrays 10, the subset preferably being one array within each stack.

Each storage cell 16 stores one bit of data suitably representing a numerical value and preferably a binary value, i.e. one or zero. Suitably, each storage cell includes two films which assume one of two stable magnetisation orientations, known as parallel and anti-parallel. The magnetisation orientation affects the resistance of the storage cell. When the storage cell 16 is in the anti-parallel state, the resistance is at its highest, and when the magnetic storage cell is in the parallel state, the resistance is at its lowest. Suitably, the anti-parallel state defines a zero logic state, and the parallel state defines a one logic state, or vice versa. As further background information, EP-A-0 918 334 (Hewlett-Packard) discloses one example of a magnetoresistive solid-state storage device which is suitable for use in preferred embodiments of the present invention.

Although generally reliable, it has been found that failures can occur which affect the ability of the device to store data reliably in the storage cells 16. Physical failures within a MRAM device can result from many causes including manufacturing imperfections, internal effects such as noise in a read process, environmental effects such as temperature and surrounding electro-magnetic noise, or ageing of the device in use. In general, failures can be classified as either systematic failures or random failures. Systematic failures consistently affect a particular storage cell or a particular group of storage cells. Random failures occur transiently and are not consistently repeatable. Typically, systematic failures arise as a result of manufacturing imperfections and ageing, whilst random failures occur in response to internal effects and to external environmental effects.

Failures are highly undesirable and mean that at least some storage cells in the device cannot be written to or read from reliably. A cell affected by a failure can become unreadable, in which case no logical value can be read from the cell, or can become unreliable, in which case the logical value read from the cell is not necessarily the same as the value written to the cell (e.g. a "1" is written but a "0" is read). The storage capacity and reliability of the device can be severely affected and in the worst case the entire device becomes unusable.

Failure mechanisms take many forms, and the following examples are amongst those identified:

1. Shorted bits—where the resistance of the storage cell is much lower than expected. Shorted bits tend to affect all storage cells lying in the same row and the same column.
2. Open bits—where the resistance of the storage cell is much higher than expected. Open bit failures can, but do not always, affect all storage cells lying in the same row or column, or both.
3. Half-select bits—where writing to a storage cell in a particular row or column causes another storage cell in the same row or column to change state. A cell which is vulnerable to half select will therefore possibly change state in response to a write access to any storage cell in the same row or column, resulting in unreliable stored data.
4. Single failed bits—where a particular storage cell fails (e.g. is stuck always as a "0"), but does not affect other storage cells and is not affected by activity in other storage cells.

These four example failure mechanisms are each systematic, in that the same storage cell or cells are consistently affected. Where the failure mechanism affects only one cell, this can be termed an isolated failure. Where the failure mechanism affects a group of cells, this can be termed a grouped failure.

Whilst the storage cells of the MRAM device can be used to store data according to any suitable logical layout, data is preferably organised into basic data units (e.g. bytes) which in turn are grouped into larger logical data units (e.g. sectors). A physical failure, and in particular a grouped failure affecting many cells, can affect many bytes and possibly many sectors. It has been found that keeping information about logical units such as bytes affected by physical failures is not efficient, due to the quantity of data involved. That is, attempts to produce a list of all such logical units rendered unusable due to at least one physical failure, tend to generate a quantity of management data which is too large to handle efficiently. Further, depending on how the data is organised on the device, a single physical failure can potentially affect a large number of logical data units, such that avoiding use of all bytes, sectors or other units affected by a failure substantially reduces the storage capacity of the device. For example, a grouped failure such as a shorted bit failure in just one storage cell affects many other storage cells, which lie in the same row or the same column. Thus, a single shorted bit failure can affect 1023 other cells lying in the same row, and 1023 cells lying in the same column—a total of 2027 affected cells. These 2027 affected cells may form part of many bytes, and many sectors, each of which would be rendered unusable by the single grouped failure.

Some improvements have been made in manufacturing processes and device construction to reduce the number of manufacturing failures and improve device longevity, but this usually involves increased manufacturing costs and complexity, and reduced device yields.

The preferred embodiments of the present invention employ error correction coding to provide a magnetoresistive solid-state storage device which is error tolerant, preferably to tolerate and recover from both random failures and systematic failures. Typically, error correction coding involves receiving original information which it is desired to store and forming encoded data which allows errors to be identified and ideally corrected. The encoded data is stored in the solid-state storage device. At read time, the original information is recovered by error correction decoding the encoded stored data. A wide range of error correction coding (ECC) schemes are available and can be employed alone or in combination. Suitable ECC schemes include both schemes with single-bit symbols (e.g. BCH) and schemes with multiple-bit symbols (e.g. Reed-Solomon).

As general background information concerning error correction coding, reference is made to the following publication: W. W. Peterson and E. J. Weldon, Jr., "Error-Correcting Codes", $2^{nd}$ edition, $12^{th}$ printing, 1994, MIT Press, Cambridge Mass.

A more specific reference concerning Reed-Solomon codes used in the preferred embodiments of the present invention is: "Reed-Solomon Codes and their Applications", ED. S. B. Wicker and V. K. Bhargava, IEEE Press, New York, 1994.

Figure 2:
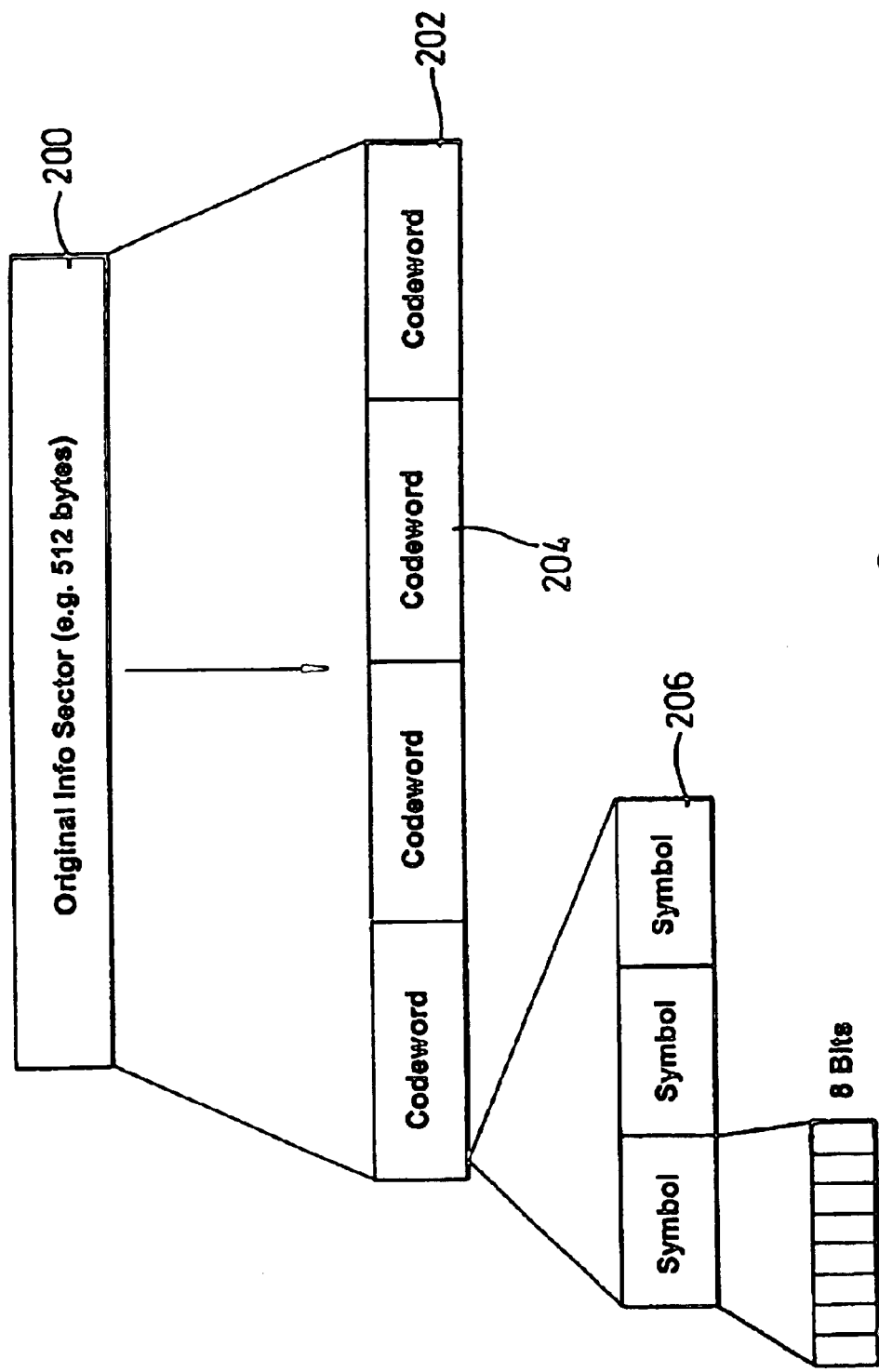
FIG. 2 shows a preferred logical data structure.

FIG. 2 shows an example logical data structure used in preferred embodiments of the present invention. Original information 200 is received in predetermined units such as a sector comprising 512 bytes. Error correction coding is performed to produce a block of encoded data 202, in this case an encoded sector. The encoded sector 202 comprises a plurality of symbols 206 which can be a single bit (e.g. a BCH code with single-bit symbols) or can comprise multiple bits (e.g. a Reed-Solomon code using multi-bit symbols). In the preferred Reed-Solomon encoding scheme, each symbol 206 conveniently comprises eight bits. As shown in FIG. 2, the encoded sector 202 comprises four codewords 204, each comprising of the order of 144 to 160 symbols. The eight bits corresponding to each symbol are conveniently stored in eight storage cells 16. A physical failure which affects any of these eight storage cells can result in one or more of the bits being unreliable (i.e. the wrong value is read) or unreadable (i.e. no value can be obtained), giving a failed symbol.

Error correction decoding the encoded data 202 allows failed symbols 206 to be identified and corrected. The preferred Reed-Solomon scheme is an example of a linear error correcting code, which mathematically identifies and corrects completely up to a predetermined maximum number of failed symbols 206, depending upon the power of the code. For example, a [160,128,33] Reed-Solomon code producing codewords having one hundred and sixty 8-bit symbols corresponding to one hundred and twenty-eight original information bytes and a minimum distance of thirty-three symbols can locate and correct up to sixteen symbol errors. Suitably, the ECC scheme employed is selected with a power sufficient to recover original information 200 from the encoded data 202 in substantially all cases. Very rarely, a block of encoded data 202 is encountered which is affected by so many failures that the original information 200 is unrecoverable. Also, even more very rarely the failures result in a mis-correct, where information recovered from the encoded data 202 is not equivalent to the original information 200. Even though the recovered information does not correspond to the original information, a mis-correct is not readily determined.

In the current MRAM devices, grouped failures tend to affect a large group of storage cells, lying in the same row or column. This provides an environment which is unlike prior storage devices. As will be described below, the preferred embodiments of the invention provide data storage arrangements that minimise the adverse affects of failures in MRAM devices. The preferred embodiments of the present invention employ an ECC scheme with multi-bit symbols. Where manufacturing processes and device design change over time, it may become more appropriate to organise storage locations expecting bit-based errors and then apply an ECC scheme using single-bit symbols, and at least some the following embodiments can be applied to single-bit symbols.

Figure 3:
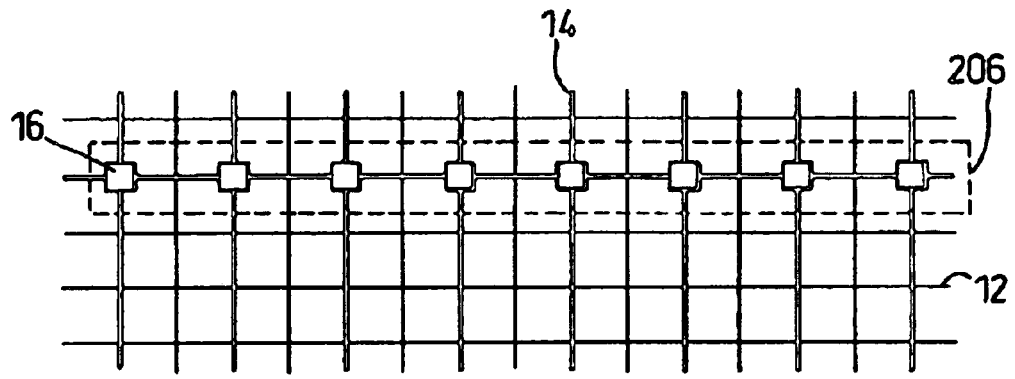
FIG. 3 shows a first preferred arrangement for storing data in the MRAM device of FIG. 1.

FIG. 3 shows a first preferred arrangement for storing data in the MRAM device 1 of FIG. 1. A plurality of bits and preferably all bits from a particular multi-bit symbol 206 stored in the same row 12 of the array 10. This gives a preferred 1×n arrangement, where n is the number of bits in each symbol.

The 1×n arrangement of FIG. 3 significantly reduces the probability that a symbol will be affected by a physical failure. Assuming the error probability of a particular grouped failure in a storage cell 16 to be a small quantity p, then if each cell of an eight-bit symbol lies in a different row and in a different column (i.e. the cells are distributed widely over the array), the symbol error probability is approximately (8+8)1024p=16384p. However, the storage arrangement of FIG. 3 substantially reduces the error probability to approximately (8+1)1024p=9216p, which corresponds to an improvement of approximately 44%.

In the 1×n arrangement of FIG. 3, a grouped failure of any of the storage cells 16 may affect all of the bits within a particular symbol. Other symbols of this block of encoded data are stored in other rows, such that they are not affected by a grouped failure in this row. In particular, data is stored such that a physical failure is likely to cause a burst error in a symbol or a small group of symbols of a particular logical block of encoded data such as a codeword 204, whilst generally not affecting other symbols in that block.

As one option, the symbols forming a block of encoded data are all distributed within a single array 10. However, in order to minimise the affect of grouped failures, preferably symbols from a block of encoded data are distributed across plural arrays 10.

In one example, each sector of original data 200 comprises of the order of 512 8-bit bytes. Depending upon the nature and power of the ECC scheme, each sector of encoded data 202 requires of the order of 576 to 640 8-bit symbols 206, suitably arranged as four codewords 204 each of 144 to 160 symbols. Hence, each encoded sector corresponds to 4608 to 5120 single-bit storage cells. Preferably, the encoded data is stored with two 8-bit symbols in one row in each of a plurality of the arrays of the macro-array.

A single slice from the macro-array provides, for example, sixteen bits representing the two stored 8-bit symbols 206 from each of the plural arrays 10, and in this example a slice from 288 or 320 arrays of a preferred 16×18×4 or 16×20×4 macro-array yields the encoded sector 202. Advantageously, the preferred 1×n symbol arrangement of FIG. 3 allows a complete encoded sector to be read from the macro-array in a single slice. By accessing plural arrays in parallel, read response times from the MRAM device are improved.

Figure 4:
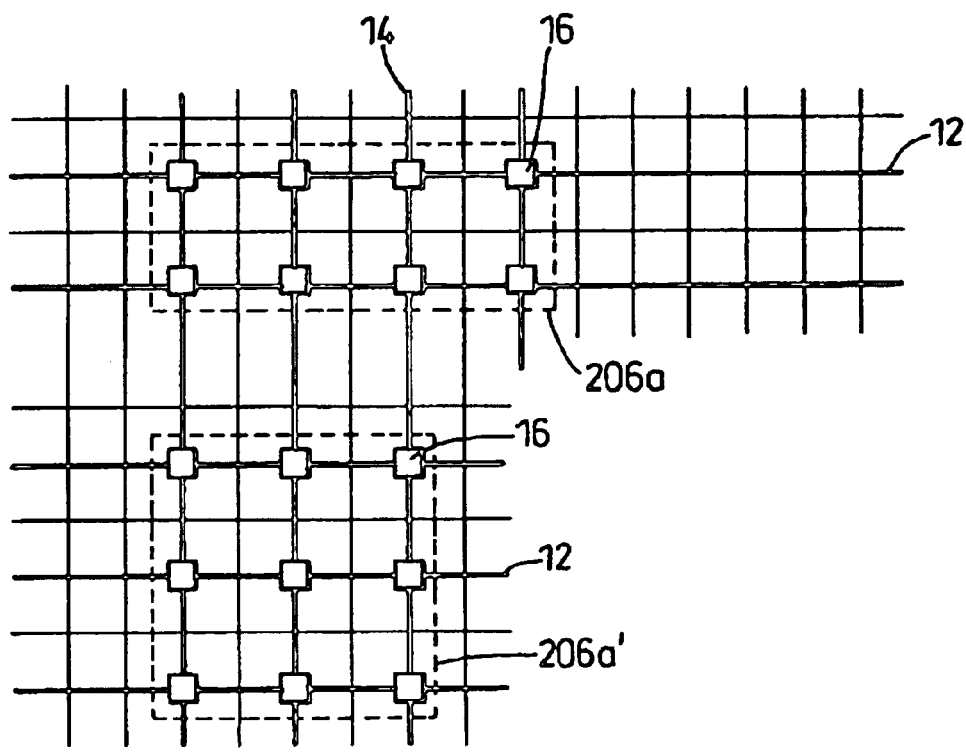
FIG. 4 shows a second preferred data storage arrangement.

FIG. 4 shows a second preferred data storage arrangement. Each multi-bit symbol 206 is arranged such that at least some bits share the same row 12, and at least some bits share the same column 14. In a first example, symbol 206a comprises eight bits, four of which lie in a first row and four of which lie in a second row. The columns are shared between the sets of bits in the two rows, such that the columns appropriate to the set of four bits in first row are used again for the set of four bits of the second row. In a second example, symbol 206a' comprises nine bits arranged in three rows and three columns, again such that the accessed columns of the first row are common to the second and third rows.

The data storage arrangement of FIG. 4 can be applied to a logical unit of data of any desired size. Where a symbol of n-bits is stored in r rows, the preferred arrangement is r×(n/r). For example, a 16-bit symbol is preferably stored as a 1×16 layout, or more preferably as a 2×8 or 4×4 layout to minimise the adverse affect of grouped failures on that symbol. This preferred arrangement distributes an equal number of bits in each row, but an unequal number is also possible.

Advantageously, the storage arrangement of FIG. 4 further reduces the probability that a symbol will be affected by a physical failure. Following on from the example given above, the symbol error probability for a 2×4 arrangement is approximately (4+2)1024p=6144p. This is an improvement of some 33% over the arrangement of FIG. 3, and an improvement of some 62% over a baseline arrangement where each bit has a separate row and column.

The arrangement of FIG. 4 has a slight disadvantage in that multiple read operations are required in order to obtain bit values for the whole symbol 206. A 2×4 arrangement requires two slices, whilst a 3×3 arrangement requires three slices. However, with currently available MRAM devices, the reduced risk of symbol failures significantly outweighs the cost of the additional read operations.

Figure 5:
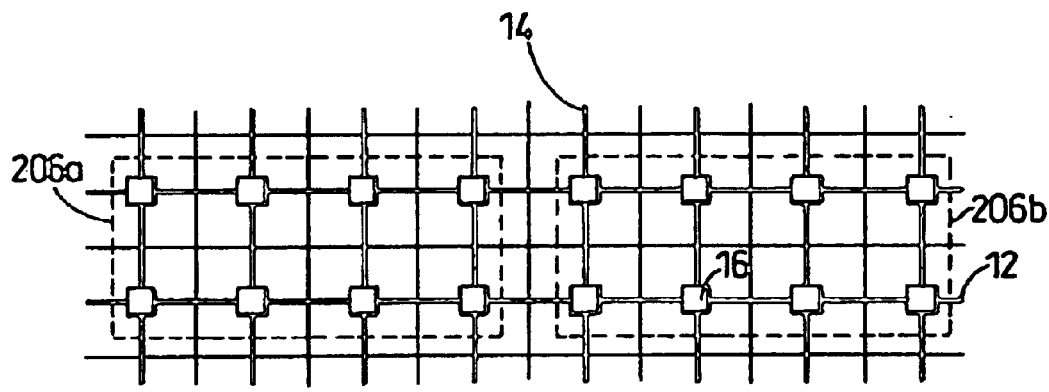
FIG. 5 shows a third preferred data storage arrangement.

FIG. 5 shows another preferred arrangement for storing data in the MRAM device 1 of FIG. 1. FIG. 5 shows two eight-bit symbols 206a and 206b each in a 2×4 arrangement as discussed with reference to FIG. 4. In the preferred array 10, having of the order of 1024 rows and 1024 columns, sixteen bits are taken from a first row in a first slice, which in this example results in four bits of the first symbol 206a and four bits of the second symbol 206b, along with four bits of two other symbols which are not shown, ie. four sets of four bits each from different symbols. A second slice from a second row likewise provides four bits to each of four symbols, to complete the four preferred eight-bit symbols. Alternatively, using the 1×n storage arrangement shown in FIG. 3, a single slice provides two eight-bit symbols. Whichever layout is preferred for each symbol, a common feature is that each slice provides a set of bits taken from at least two symbols 206a and 206b. Preferably, these symbols 206a and 206b are allocated to at least two separate units of encoded data such as two codewords 204. That is, the first symbol 206a is allocated to a first codeword 204, whilst the adjacent second symbol 206b is allocated to a second codeword 204. These two codewords suitably form part of the same block of encoded data 202, from which a complete original information sector 200 can be recovered.

Figure 6:
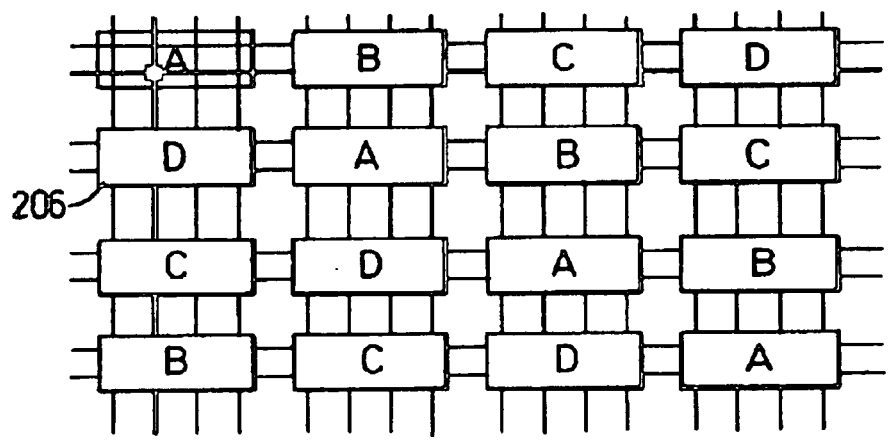
FIG. 6 shows a fourth preferred data storage arrangement.

Advantageously, a grouped failure affecting a particular row 12 affects symbols 206a and 206b in different codewords 204. The data storage arrangement of FIG. 5 minimises the effect of a grouped failure in any particular codeword. Since the preferred error correction coding is limited by its power to correcting a particular number of symbols within each codeword, advantageously the storage arrangement of FIG. 5 allows efficient use of the ECC decoding scheme within each codeword. FIG. 6 shows another preferred method for storing data in the MRAM device 1 of FIG. 1. In at least some preferred embodiments of the present invention it is desired to store many or even all symbols of a particular block of encoded data, such as an encoded codeword 204, in a single array 10. One example is a quarter-size macro-array, wherein the macro-array has a 8×10×4 layout instead of a full-size 16×20×4 layout. Preferably, even in this situation it is desired to maximise device read and write access speed, whilst minimising exposure to physical failures.

FIG. 6 shows part of an array 10 with symbols 206 allocated to four codewords A, B, C, D which together form an encoded sector 202. A similar storage arrangement suitably occurs in each of some or all other arrays of the macro-array, to provide a complete encoded sector in relatively few slices. Each symbol is stored in a 2×4 arrangement, as discussed above with reference to FIG. 4, which allows an encoded sector to be accessed in only eight slices. For convenient access to the array, some or all columns are shared in subsequent rows, and ideally the data is stored in consecutive rows.

In FIG. 6, the four sets of bits obtained from each slice are each allocated to symbols within the four different codewords A, B, C, D, which is similar to the embodiment as discussed above with reference to FIG. 5. Further, in FIG. 6, allocation of the symbols from each pair of slices changes amongst the four codewords A, B, C, D, between at least some of the rows. That is, sets of bits from a first set of rows (here the first pair) are allocated to codewords A, B, C, D in order, whilst sets of bits from a second set of rows are allocated to codewords D, A, B, C, in order. Any suitable redistribution may be employed, but preferably the order is rotated between each set of rows for simple management.

Advantageously, the impact of any single grouped failure on a particular codeword is minimised, which increases the probability of recovering the original data 200 from the encoded stored data 202. In FIG. 6, a grouped failure is shown affecting the row and column at lines 12, 14 in bold. The grouped failure affects one symbol from codeword A, and two symbols in each of codewords B, C and D. By contrast, if all of the affected symbols were from a single codeword, then that codeword would suffer seven (as opposed to only one or two) failed symbols. Therefore, the effect of this grouped failure on each codeword 204 is substantially reduced, due to changing the order of the symbols amongst the codewords. As a result, a lower-powered ECC coding scheme can be employed and/or a great number of failures can be tolerated for the same ECC overhead.

Figure 7:
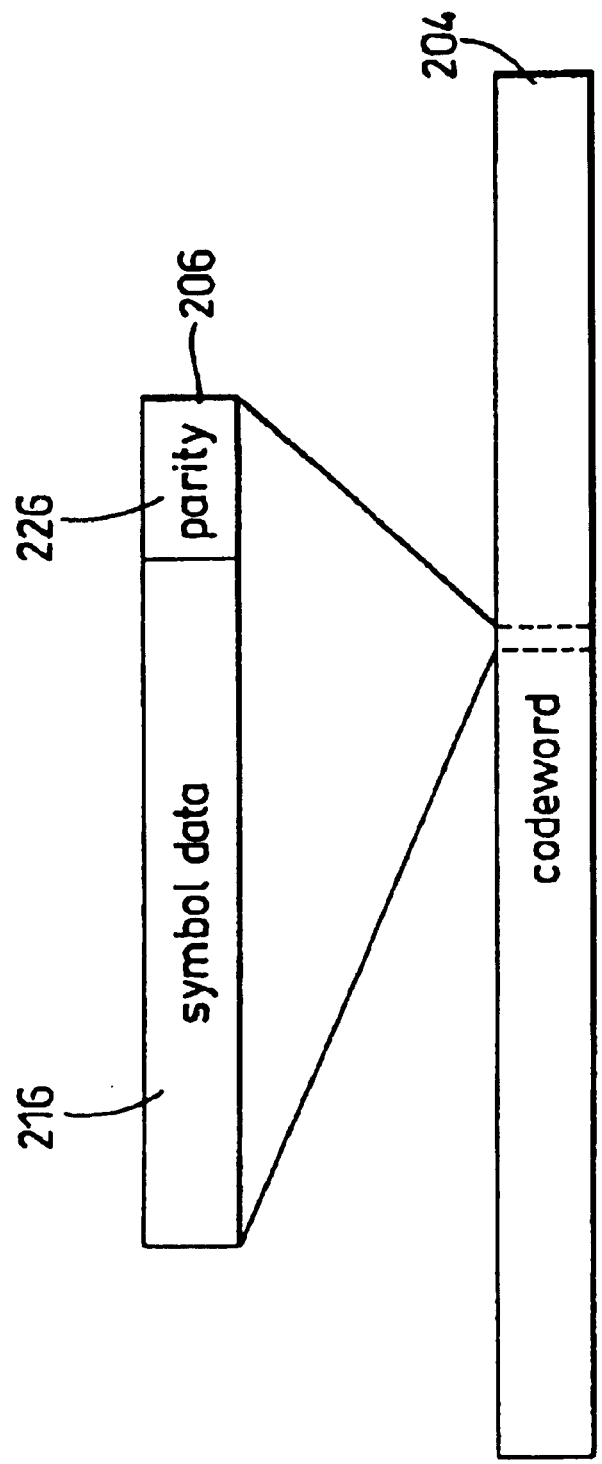
FIG. 7 shows a fifth preferred data storage arrangement.

FIG. 7 shows another preferred data storage arrangement, wherein at least two levels of error correction coding are employed. At a first level, the original data is encoded such as by using a linear error correction coding scheme to form symbol-based encoded data 204. Each symbol is then associated with a second level of error detection coding, or even error correction coding. In this example each symbol 206 is associated with a single parity bit 226 that allows a parity check to be performed on the eight-bit symbol. Each symbol unit 206 therefore comprises nine bits, including the error checking parity bit, which are conveniently stored together, such as in a 1×9 arrangement or preferably a 3×3 arrangement as shown in symbol 206a' in FIG. 4. The preferred single parity bit allows an odd number of bit errors in a multiple-bit symbol to be identified. Advantageously, identifying the zero or more symbols in a block of ECC encoded data which are subject to such errors improves the ability of the ECC decoder 22 to perform error correction decoding.

The MRAM device described herein is ideally suited for use in place of any prior solid-state storage device. In particular, the MRAM device is ideally suited both for use as a short-term storage device (e.g. cache memory) or as a longer-term storage device (e.g. a solid-state hard disk). An MRAM device can be employed for both short term and longer term storage within a single apparatus, such as a computing platform.

A magnetoresistive solid-state storage device and methods for storing data in such a device have been described. The preferred embodiments of the present invention minimise the risk of data loss due to failures. Advantageously, the storage device is able to tolerate a relatively large number of physical failures, including both systematic failures and random failures, whilst successfully remaining in operation with no loss of original data. Simpler and lower cost manufacturing techniques can be employed and/or device yield and device density can be increased for the same or reduced ECC overhead.

What is claimed is:

1. A method for storing data in a magnetoresistive solid-state storage device having an array of storage cells, wherein the storage cells of the array are arranged in rows, the method comprising the steps of:

encoding a logical unit of original information to form a block of ECC encoded data, wherein the ECC encoded data is formed having multi-bit symbols; and controlling the storing of the block of ECC encoded data in the array of storage cells to insure that a plurality of bits from each multi-bit symbol are stored in the same one of the rows.

2. The method of claim 1, comprising the further step of:

controlling the storing the block of ECC encoded data in the array of storage cells, to insure that all bits of each multi-bit symbol are stored in the same row.

3. The method of claim 1, wherein the block of ECC encoded data comprises a plurality of n-bit symbols, with all n bits of each symbol being stored in one row of the rows of storage cells.

4. The method of claim 3, wherein the n bits of a symbol are spaced at least a minimum reading distance m apart, such that all n bits are readable from a row in a single slice.

5. The method of claim 1, comprising the further steps of:

controlling the storing the block of ECC encoded data in the array of storage cells to insure that at least a plurality of the arrays are arranged to store one or more symbols of the block of ECC encoded data.

6. The method of claim 5, wherein each of the plural arrays is arranged to store one or more symbols of the block of ECC encoded data.

7. The method of claim 5, wherein at least a substantial portion of the block of ECC encoded data is readable from the device in a single slice.

8. The method of claim 7, wherein the slice comprises accessing one row from each of the plural arrays.

9. The method of claim 1, comprising the further step of:
controlling the storing the block of ECC encoded data in the array of storage cells, to insure that the multi-bit symbols are each stored with one or more bits in at least two of the rows.

10. The method of claim 9, wherein for each multi-bit symbol a first set of bits are stored in a first row, and a second set of bits are stored in a second row, such that at least some columns of the first set of bits are common to at least some columns of the second set of bits.

11. The method of claim 10, wherein each of the first and second sets of bits comprises a plurality of bits.

12. The method of claim 10, wherein each n-bit symbol is stored across a plurality of rows r, and the n bits of each symbol are stored in an arrangement of storage cells according to r×(n/r).

13. The method of claim 9, wherein each symbol is readable by taking a slice from each of the at least two rows.

14. The method of claim 13, wherein the storage device comprises plural arrays, at least some of the plural arrays being arranged to store one or more symbols of the block of ECC encoded data, such that at least a substantial portion of the block of ECC encoded data is readable from the device in a single slice.

15. The method of claim 14, wherein each slice comprises accessing one row from each of the plural arrays.

16. The method of claim 1, wherein the ECC encoded data is formed having multi-bit symbols, the method comprising the further step of:
controlling the storing the block of ECC encoded data in the array of storage cells to insure that at least one of the rows stores a set of bits from at least two of the multi-bit symbols.

17. The method of claim 16, wherein each set of bits is allocated to a different one of at least two blocks of ECC encoded data.

18. The method of claim 16, wherein each set of bits is allocated to a different one of a plurality of codewords, plural codewords being associated to form a sector of ECC encoded data representing the logical unit of original information.

19. The method of claim 18, wherein the sets of bits are each allocated to symbols within a different codeword of a single Sector of ECC encoded data.

20. The method of claim 16, wherein each of the sets of bits comprises all bits from a multi-bit symbol, such that for each multi-bit symbol all bits are stored in a single row.

21. The method of claim 16, wherein a multi-bit symbol is stored with bits in at least two rows.

22. The method of claim 21, wherein for each multi-bit symbol a first set of bits are stored in a first row, and a second set of bits are stored in second row, such that at least some columns of the first set of bits are common to at least some columns of the second set of bits.

23. The method of claim 1, wherein the ECC encoded data is formed having single-bit symbols, the method comprising the further step of:
controlling the storing of the block of ECC encoded data in the array of storage cells to insure that at least one of the rows stores at least two of the single-bit symbols.

24. The method of claim 23, wherein each of the at least two single-bit symbols is allocated to a different one of at least two blocks of encoded data.

25. The method of claim 24, wherein each of the at least two single-bit symbols is allocated to a different one of a plurality of codewords, plural codewords being associated to form a sector of ECC encoded data representing a logical unit of original information.

26. The method of claim 25, wherein each of the at least two single-bit symbols is allocated to a different codeword of a single sector of ECC encoded data.

27. The method of claim 1, comprising the further step of:
controlling the storing of the block of ECC encoded data in the array of storage cells to insure that each row stores a set of bits from each of at least two symbols, the sets of bits in each row being allocated to at least two different units of encoded data, and an order of allocation amongst the units of encoded data being changed between at least some rows.

28. The method of claim 27, wherein a first row stores a set of bits from a symbol allocated to a first codeword, and a set of bits from a symbol allocated to a second codeword, and a second row storing, in order, a set of bits from a symbol allocated to the second codeword, and then a set of bits from a symbol allocated to the first codeword.

29. The method of claim 27, wherein the sets of bits in each row share at least some columns.

30. The method of claim 27, wherein the order of allocation is rotated between at least some rows.

31. The method of claim 1, wherein the ECC encoded data is formed having multi-bit symbols, the method comprising the further step of:
storing the block of ECC encoded data in the array of storage cells, and wherein the encoding step comprises forming an error check for each multi-bit symbol.

32. The method of claim 31, comprising providing at least one error detecting bit associated with each multi-bit symbol.

33. The method of claim 32, wherein the error detecting bit or bits allow a parity check to be performed on the multi-bit symbol.

34. The method of claim 32, wherein the storing step comprises storing each multi-bit symbol and one or more error detecting bits together in the array as a symbol unit.

35. The method of claim 34, wherein the storing step comprises storing each symbol unit with all bits in a single row of storage cells.

36. The method of claim 34, wherein the storing step comprises storing each symbol unit with bits in at least two rows of storage cells.

37. The method of claim 36, wherein the storage cells are arranged in rows and columns and, for a symbol unit, a first set of bits are stored in a first row, and a second set of bits are stored in a second row, such that at least some columns of the first set of bits are common to at least some columns of the second set of bits.

38. A magnetoresistive solid-state storage device, comprising:
at least one array of magnetoresistive storage cells, wherein the storage cells of the array are arranged in rows;
an ECC encoding unit for encoding a logical unit of original information to form a block of ECC encoded data, wherein the ECC encoded data is formed having multi-bit symbols; and
a controller for storing the block of ECC encoded data in the at least one array of storage cells so that a plurality of bits from a multi-bit symbol are stored in one of the rows.

39. The magnetoresistive solid-state storage device of claim 38, wherein the controller is arranged so that all bits of a multi-bit symbol of ECC encoded data are stored in a single row.

40. The device of claim 39, wherein the block of ECC encoded data comprises a plurality of n-bit symbols, with all n bits of each symbol being stored in one row of the rows of storage cells.

41. The device of claim 40, wherein the n bits of a symbol are spaced at least a minimum reading distance m apart, such that all n bits are readable from a row in a single slice.

42. The device of claim 41, wherein the storage device comprises plural arrays, at least some of the arrays being arranged to store one or more symbols of the block of ECC encoded data.

43. The device of claim 42, wherein each of the plural arrays is arranged to store one or more symbols of the block of ECC encoded data.

44. The device of claim 43, wherein at least a substantial portion of the block of ECC encoded data is readable from the device in a single slice.

45. The device of claim 44, wherein the slice comprises accessing one row from each of the plural arrays.

46. The device of claim 38, wherein the controller is arranged so that a multi-bit symbol is stored with one or more bits in at least two of the rows.

47. The device of claim 46, wherein for each multi-bit symbol a first set of bits are stored in a first row, and a second set of bits are stored in a second row, such that at least some columns of the first set of bits are common to at least some columns of the second set of bits.

48. The device of claim 47, wherein each of the first and second sets of bits comprises a plurality of bits.

49. The device of claim 47, wherein each n-bit symbol is stored across a plurality of rows r, and the n bits of each symbol are stored in an arrangement of storage cells according to r×(n/r).

50. The device of claim 46, wherein each symbol is readable by taking a slice from each of the at least two rows.

51. The device of claim 50, wherein the storage device comprises plural arrays, at least some of the plural arrays being arranged to store one or more symbols of the block of ECC encoded data, such that at least a substantial portion of the block of ECC encoded data is readable from the device in a single slice.

52. The device of claim 51, wherein each slice comprises accessing one row from each of the plural arrays.

53. The device of claim 38, wherein the controller is arranged so that at least one of the rows stores a set of bits from at least two of the multi-bit symbols.

54. The device of claim 53, wherein each set of bits is allocated to a different one of at least two blocks of encoded data.

55. The device of claim 54, wherein each set of bits is allocated to a different one of a plurality of codewords, plural codewords being associated to form a sector of ECC encoded data representing a logical unit of original information.

56. The device of claim 55, wherein the sets of bits are each allocated to symbols within a different codeword of a single sector of ECC encoded data.

57. The device of claim 53, wherein each of the sets of bits comprises all bits from a multi-bit symbol, such that for each multi-bit symbol all bits are stored in a single row.

58. The device of claim 53, wherein a multi-bit symbol is stored with bits in at least two rows.

59. The device of claim 58, wherein for each multi-bit symbol a first set of bits are stored in a first row, and a second set of bits are stored in a second row, such that at least some columns of the first set of bits are common to at least some columns of the second set of bits.

60. The device of claim 38, wherein the ECC encoded data is formed having single-bit symbols and the controller is arranged so that at least one of the rows stores at least two of the single-bit symbols.

61. The device of claim 60, wherein each of the at least two single-bit symbols is allocated to a different one of at least two blocks of encoded data.

62. The device of claim 61, wherein each of the at least two single-bit symbols is allocated to a different one of a plurality of codewords, plural codewords being associated to form a sector of ECC encoded data representing a logical unit of original information.

63. The device of claim 62, wherein the at least two single-bit symbols are each allocated to a different codeword of a single sector of ECC encoded data.

64. The device of claim 38, wherein the controller is arranged so that each row stores a set of bits from each of at least two symbols, the sets of bits in each row being allocated to at least two different units of encoded data, and an order of allocation amongst the units of encoded data is changed between at least some rows.

65. The device of claim 64, wherein a first row stores a set of bits from a symbol allocated to a first codeword, and a set of bits from a symbol allocated to a second codeword, and a second row storing, in order, a set of bits from a symbol allocated to the second codeword, and then a set of bits from a symbol allocated to the first codeword.

66. The device of claim 64, wherein the sets of bits in a first row share at least some columns with the sets of bits in a second row.

67. The device of claim 64, wherein the order of allocation is rotated between at least some rows.

68. The device of claim 38, wherein the EGG encoded data is formed having multi-bit symbols, and wherein the EGG encoding unit forms an error check for each multi-bit symbol.

69. The device of claim 68, wherein the ECC encoding unit forms at least one error detecting bit associated with each multi-bit symbol.

70. The device of claim 69, wherein the error detecting bit or bits allow a parity check to be performed on the multi-bit symbol.

71. The device of claim 70, wherein each multi-bit symbol and one or more error detecting bits are stored together in the array as a symbol unit.

72. The device of claim 71, wherein each symbol unit is stored having all bits in a single row of storage cells.

73. The device of claim 71, wherein each symbol unit is stored having bits in at least two rows of storage cells.

74. The device of claim 73, wherein the storage cells are arranged in rows and columns and, for a symbol unit, a first set of bits are stored in a first row, and a second set of bits are stored in a second row, such that at least some columns of the first set of bits are common to at least some columns of the second set of bits.

75. A computing platform including a magnetoresistive solid-state storage device, the device comprising:

at least one array of magnetoresistive storage cells, wherein the storage cells of the array are arranged in rows;

an ECC encoding unit for encoding a logical unit of original information to form a block of ECC encoded data, wherein the ECC encoded data is formed having multi-bit symbols; and a controller for storing the block of ECC encoded data in the at least one array of storage cells so that a plurality of bits from a multi-bit symbol are stored in one of the rows.

* * * * *